United States Patent
Weikard et al.

(10) Patent No.: US 6,569,944 B2
(45) Date of Patent: May 27, 2003

(54) PROCESS FOR PREPARING URETHANES CONTAINING (METH)-ACRYLOYL GROUPS AS BINDERS FOR POWDER COATINGS

(75) Inventors: Jan Weikard, Köln (DE); Christian Zwiener, Köln (DE); Wolfgang Fischer, Meerbusch (DE); Peter Thometzek, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 98 days.

(21) Appl. No.: 09/810,989

(22) Filed: Mar. 16, 2001

(65) Prior Publication Data

US 2001/0051668 A1 Dec. 13, 2001

(30) Foreign Application Priority Data

Mar. 31, 2000 (DE) .......................... 100 16 193

(51) Int. Cl.$^7$ ............................... C08L 75/14
(52) U.S. Cl. .................. 525/131; 525/123; 525/457; 525/458; 428/425.1; 428/425.8; 428/423.1
(58) Field of Search ........................... 522/96; 526/301; 428/425.1, 425.8, 423.1; 525/457, 458, 123, 131

(56) References Cited

U.S. PATENT DOCUMENTS 3,907,751 A  9/1975  Knight et al. ........... 260/47 US
5,068,305 A  11/1991  Meixner et al. .............. 528/49
5,703,198 A  12/1997  Twigt et al. ................. 528/303

FOREIGN PATENT DOCUMENTS

CA  2157658  3/1996
CA  2316528  2/2001

OTHER PUBLICATIONS

J. of Coatings Technology, vol. 70, No. 884, 9/98, pp. 57–62, M. Johansson et al, "On the Synthesis and Characterization of New Low Temperature Curing Powder Coatings Cured with Radiation".

Primary Examiner—James J. Seidleck
Assistant Examiner—Melanie Bissett
(74) Attorney, Agent, or Firm—Joseph C. Gil; Thomas W. Roy

(57) ABSTRACT

The present invention relates to a process for preparing urethanes containing (meth)acryloyl groups that are suitable as binders for powder coatings by reacting a polyisocyanate component with a hydroxyl group-containing component that contains at least one compound additionally containing (meth)acryloyl groups in a melt of compounds containing (meth)acryloyl groups, which are crystalline in the solid state and have a melting point of 30 to 100° C. and a dynamic viscosity at 111° C. of less than 10 Pa·s, at elevated temperature until the NCO content has dropped below 0.5 wt. %. The present invention also relates to the use of these urethanes as binders for powder coating compositions for coating substrates made of wood, metal, plastics or mineral substances, which may have been primed.

6 Claims, No Drawings

PROCESS FOR PREPARING URETHANES CONTAINING (METH)-ACRYLOYL GROUPS AS BINDERS FOR POWDER COATINGS

BACKGROUND OF THE INVENTION

1. Field of the Invention

The present invention relates to a process for preparing binders for powder coating compositions from urethanes that contain (meth)acryloyl groups and that are cured after application to a substrate and melting by heat by means of high-energy radiation, in particular UV radiation, and also to powder coating compositions containing these binders.

2. Description of the Prior Art

Particularly high-quality powder coatings are obtained using oligourethanes or polyurethanes. Such compounds are described, for example, in EP-A 410 242. They are prepared by reacting at least one organic polyisocyanate with an alcohol component containing (meth)acryloyl groups and additionally at least one compound free of (meth)acryloyl groups and containing isocyanate-reactive groups.

These compounds have to be prepared in an organic solvent since a solvent-free preparation is unsuccessful due to the high viscosities of the compounds at temperatures below 120° C. An increase in the preparation temperature above 100 to 120° C. involves the risk, known to the person skilled in the art, of a spontaneous, unintended polymerization of the compounds containing (meth)acryloyl groups. The disadvantage of the binders described in EP-A 410 242 is that the preparation takes place in a solvent that has to be removed again at the end of the preparation at high cost. Even small residues of solvent considerably affect the melting behavior, which is critical for the application of powder coatings.

To lower the melt viscosity of powder coating compositions containing unsaturated polyesters or acryloyl-functional polyacrylates, the powders are mixed, according to the teachings of EP-A 636 669, with a low-molecular-weight crosslinking substance having vinyl-ether, vinyl-ester or (meth)acrylate functionality after their preparation. In the application cited, the crosslinking substance is also prepared in a solvent that has to be removed afterwards. Furthermore, mixtures of vinyl ethers or vinyl esters with unsaturated (meth)acrylates involve an appreciably higher risk of an unintended spontaneous polymerization (copolymerization of electron-abundant and electron-deficient double bonds) occurring than, for example, in pure (meth)acrylate systems.

In the journal of Coatings Technology, Vol. 70, No. 884, Sep. 1998, 57–62, A. Hult et al. describes radiation-curable powder coatings containing mixtures of amorphous (meth) acrylate-functional polymers (polyacrylate) and crystalline (meth)acrylate monomers. Again, it is necessary to prepare the above-mentioned polymers and monomers separately and using solvents, which have to be removed after the preparation at high cost.

An object of the present invention is to provide a process for preparing oligo-urethanes and polyurethanes containing (meth)acryloyl groups as binders for powder coatings, which process does not have the known disadvantages of preparation in solvents.

This object may be achieved in accordance with the present invention by preparing urethane acrylates for powder coatings without solvent as described hereinafter.

SUMMARY OF THE INVENTION

The present invention relates to a process for preparing urethanes containing (meth)acryloyl groups that are suitable as binders for powder coatings by reacting a polyisocyanate component with a hydroxyl group-containing component that contains at least one compound additionally containing (meth)acryloyl groups in a melt of compounds containing (meth)acryloyl groups, which are crystalline in the solid state, and have a melting point of 30 to 100° C. and a dynamic viscosity at 111° C. of less than 10 Pa·s, at elevated temperature until the NCO content has dropped below 0.5 wt. %.

The present invention also relates to the use of these urethanes as binders for powder coating compositions for coating substrates made of wood, metal, plastics or mineral substances, which may have been primed.

DETAILED DESCRIPTION OF THE INVENTION

The urethane acrylates prepared according to the invention are valuable constituents for powder coating compositions. After melting and radiation-induced curing, the resulting powder coatings yield high-quality lacquer films that are not crystalline.

The process according to the invention is performed in two stages. The compounds containing (meth)acryloyl groups, which are crystalline in the solid state and have a melting point of 30 to 110° C., are prepared in a first stage. The urethane acrylates disclosed, for example, in EP-A 410 242 are then prepared without using solvents in the melt of said compounds at temperatures below 120° C.

Various reactions may be used to prepare the compounds containing (meth)acryloyl groups that are crystalline in the solid state and have a melting point of 30 to 110° C. Thus, it is possible to react monohydroxyalkyl (meth)acrylates containing 2 to 8 carbon atoms in the alkyl group with mono-, di- or triisocyanates. Examples of monohydroxy-alkyl (meth)acrylates include 2-hydroxyethyl (meth) acrylate, 2- or 3-hydroxypropyl (meth)acrylate and 2-, 3- or 4-hydroxybutyl (meth)acrylate.

Examples of isocyanates include cyclohexyl isocyanate, butylene diisocyanate, hexamethylene diisocyanate (HDI), isophorone diisocyanate (IPDI), 3(4)-(isocyanatomethyl) methyl-cyclohexyl isocyanate (IMCI), trimethylhexamethylene diisocyanate (2,2,4- and/or 2,4,4,-trimethylhexamethylene diisocyanate), the isomeric bis(4, 4'-isocyanatocyclohexyl)methanes, isocyanatomethyl-1,8-octoane diisocyanate, 1,4-cyclohexylene diisocyanate, phenyl isocyanate, tolyl isocyanate, 1,4-phenylene diisocyanate, 2,4- and/or 2,6-tolylene diisocyanate (TDI), 1,5-naphthylene diisocyanate, 2,4'- and/or 4,4'-diphenylmethane diisocyanate (MDI), triphenylmethane-4, 4',4"-triisocyanate. Also suitable are derivatives of these monomers which contain urethane, isocyanurate, allophanate, biuret, uretdione and/or iminooxadiazinedione groups. HDI, IPDI, TDI, MDI and the isomeric bis(4,4'-isocyanato-cyclo-hexyl)methanes and mixtures thereof are preferred. HDI is particularly preferred.

A prerequisite for the suitability of a particular reaction product of the above-mentioned compounds is its melting range, which must be between 30 and 110° C. for the process according to the invention. Preferred are compounds that have a sharp melting point. Furthermore, the dynamic viscosity of the compounds at 111° C. must be less than 10 Pa·s, preferably less than 5 Pa·s, and more preferably less than 1 Pa·s. Particularly preferred compounds are the reaction products of 1 mole of HDI, TDI or MDI with 2 moles of 2-hydroxyethyl acrylate or 2-hydroxyethyl(meth)acrylate.

The reaction of hydroxy-functional acrylates with isocyanates is known, for example, from Chemistry &

Technology of UV & EB Formulations For Coatings, Inks & Paints, Vol. 2, 1991, SITA Technology, London, pages 73–97 by P. K. T. Oldring (ed.). In this procedure the isocyanate is taken and while an oxygen-containing gas, preferably air, is passed through it, it is reacted with the hydroxy-functional acrylate at a temperature above the melting point of the product to be prepared in the temperature range 30 to 120° C. until the NCO content has dropped below 0.5, preferably below 0.2 wt. %. It is also possible to take the hydroxy-functional acrylate and react it with isocyanate under the same conditions.

This addition reaction to form the (poly)urethane can be accelerated in known manner with suitable catalysts, for example, tin octoate, dibutyltin dilaurate or tertiary amines, such as dimethylbenzylamine. The resulting urethane acrylate can be stabilized against premature and undesirable polymerization by adding suitable inhibitors and antioxidants, such as phenols and/or hydroquinones, in amounts, in each case, of 01 to 0.5 wt. %, based on the weight of the (poly)urethane. These auxiliaries can be added either at the same time as and/or after the reaction resulting in the (poly)urethane.

In addition to the isocyanate-hydroxyl reaction described above, epoxy-acid reactions or the reaction of hydroxy compounds with carboxylic acids and/or carboxylic anhydrides, for example, can be performed to prepare the compounds containing (meth)acryloyl groups that are crystalline in the solid state and have a melting point of 30 to 110° C. Examples include the reaction of epoxides containing (meth)acryloyl groups (for example, glycidyl (meth) acrylate) with aliphatic and/or aromatic dicarboxylic acids, the reaction of (meth)acrylic acid with monomeric mono- or di-functional epoxy compounds (for example, diglycidyl ethers of bisphenol A or hexanediol), the esterification of alcohols (for example, bisphenol A or 1,4-cyclohexane-dimethanol) with (meth)acrylic acid and the reaction of carboxylic anhydrides with hydroxyalkyl (meth)acrylates. If the esterification is performed, water of reaction from the reaction mixture is removed by applying a vacuum or other known measures.

The reaction of epoxides with unsaturated carboxylic acids is known, for example, from Chemistry & Technology of UV & EB Formulations For Coatings, Inks & Paints, Vol. 2, 1991, SITA Technology, London, pages 37–57 by P. K. T. Oldring (ed.). The esterification of alcohols with (meth) acrylic acid is also disclosed in this reference on pages 240–242.

The urethane acrylates disclosed, for example, in EP-A 410 242 can then be prepared without using solvents at temperatures not exceeding 120° C. in the melt of these compounds containing (meth)acryloyl groups that are crystalline in the solid state and have a melting point of 30 to 110° C.

The polyurethanes containing (meth)acryloyl groups melt within the temperature range of 40–200° C., have a content of olefinic double bonds in the form of (meth)acryloyl groups (calculated as =C=C=, molecular weight 24) of 2 to 12 wt. % and are prepared by reacting A) 40 to 80 parts by weight of a polyisocyanate component containing at least one organic polyisocyanate with B) 15 to 50 parts by weight of an alcohol component having (meth)acryloyl groups that contains at least one monohydric alcohol having (meth)acryloyl groups and C) 2 to 20 parts by weight of an additional component containing one or more compounds that are free of (meth)acryloyl groups and contain isocyanate-reactive groups.

The polyurethanes to be used according to the invention are prepared by reacting the starting components A)-C) in amounts such that the resulting polyurethanes are essentially free of isocyanate groups (NCO content <0.2%) and have a number average molecular weight of 800 to 100,000.

Component A) contains at least one organic polyisocyanate. Suitable polyisocyanates include the known organic polyisocyanates from polyurethane chemistry that contain aliphatically, cycloaliphatically and/or aromatically bound isocyanate groups and preferably have a molecular weight of 144 to 1000, more preferably 168 to 300. Examples include butylene diisocyanate, hexamethylene diisocyanate (HDI), isophorone diisocyanate (IPDI), 3(4)-(isocyanatomethyl) methylcyclohexyl isocyanate (IMCI), trimethylhexamethylene diisocyanate (2,2,4- and/or 2,4,4-trimethylhexamethylene diisocyanate), the isomeric bis(4,4'-isocyanatocyclo-hexyl)methanes, isocyanatomethyl-1,8-octane diisocyanate, 1,4-cyclohexylene diisocyanate, 1,4-phenylene diisocyanate, 2,4- and/or 2,6-tolylene diisocyanate (TDI), 1,5-naphthylene diisocyanate, 2,4'- and/or 4,4'-diphenylmethane diiusocyanate (MDI), triphenylmethane-4,4', 4"-triisocyanate. Also suitable are derivatives of these monomers having urethane, isocyanurate, allophanate, biuret, uretdione and/or iminooxadiazinedione groups. Preferably these derivatives have a molecular weight of up to approximately 1000. The preparation of the derivatives is described, for example, in U.S. Pat. No. 3,124,605, U.S. Pat. No. 3,183,112, U.S. Pat. No. 3,919,218, U.S. Pat. No. 4,324,879 and EP-A 798 299.

Preferably, HDI, IPDI, MDI and/or polyisocyanates containing isocyanurate groups and obtained by the trimerization of HDI or IPDI are used as component A).

Component B) contains at least one monohydric alcohol containing (meth)acryloyl groups. Examples include hydroxyalkyl esters of acrylic acid or methacrylic acid, preferably containing 2 to 4 carbon atoms in the hydroxyalkyl radical, such as hydroxyethyl (meth)acrylate, 2- and 3-hydroxypropyl (meth)acrylate and 2-, 3- and 4-hydroxybutyl (meth)acrylate. 2-hydroxyethyl acrylate is preferred.

Component C) contains at least one organic compound, which is free from (meth)acryloyl groups and contains at least two, preferably 2 to 4 and more preferably 2 to 3 isocyanate-reactive groups, preferably alcoholic hydroxyl groups. Preferably, the compounds used as component C) or as a portion of component C) have a molecular weight of 62 to 200. Examples include ethylene glycol, 1,2- and 1,3-propanediol, neopentyl glycol, butanediol, hexanediol, glycerol, trimethylolethane, trimethylolpropane and pentaerythritol. In addition, the higher molecular weight compounds known from polyurethane chemistry and containing isocyanate-reactive groups groups, preferably hydroxyl groups, (for example the known polyhydroxy polyethers and polyhydroxy polyesters having a molecular weight of over 200) can be used as component C) or a portion of component C).

It is possible to prepare these polyurethanes by reacting the starting components in a melt of the compounds that are crystalline in the solid state and contain (meth)acryloyl groups and have a melting point of 30 to 110° C. The reaction temperatures are preferably 30 to 120° C., more preferably 50 to 100° C. In this embodiment the reaction between component A) and component B) is preferably carried out in a first reaction step, followed by the reaction of the intermediate with component C).

In practice, the procedure may be such that the polyisocyanate is taken and reacted with unsaturated monoalcohol B) under mild conditions, for example within the above-mentioned temperature ranges, and this is followed by the reaction with component C), also within the stated temperature ranges, until the NCO content has dropped below 0.5, preferably below 0.2 wt. %.

The addition reaction to form the polyurethane can be accelerated in known manner with suitable catalysts, such as tin octoate, dibutyltin dilaurate or tertiary amines, such as dimethylbenzylamine. The reaction product may be protected against premature and undesirable polymerization by adding suitable inhibitors and anti-oxidants as previously described.

Preferably, an oxygen-containing gas (for example, air) is passed through the reaction mixture during formation of the polyurethane.

The polyurethanes or urethane acrylates obtained by the process according to the invention are valuable binders for powder coating compositions. They can be processed without further additives as heat-crosslinkable, clear powder coatings (if the binder were identical to the coating composition) or, preferably, provided with the known additives from lacquer technology. Examples of these additives include pigments such as titanium dioxide and flow control agents such as polybutyl acrylate or silicones. The additives are homogenized, for example, in extruders or compounders at temperatures of approximately 40 to 140, preferably 60 to 80° C. However, it is also possible to stir the additives into the melt immediately after the end of the preparation.

The solid obtained is ground in known manner and freed of coarse particle components, preferably those having a particle size above 0.1 mm, by screening.

The resulting powdered coating compositions can be applied by standard powder application methods, such as electrostatic powder spraying, triboelectric application or fluidized bed coating to the substrates to be coated. The coatings are then first melted by exposure to heat (for example, by IR radiators) and a clear film is formed if no pigments or matting agents were incorporated. The temperature needed for the melting and flow of the powder is above the melting range of the coating composition. The coatings can be cured either by heating at a temperature of 130 to 220° C., preferably 150 to 190° C., and/or by exposure to high-energy radiation, such as UV radiation or electron radiation.

In the case of crosslinking by means of UV irradiation, it is necessary to homogeneously incorporate photoinitiators into the coating compositions. The known photoinitiators may be used if they do not adversely affect the powder properties, such as free flowability and storage capability. Examples include 1-hydroxycyclohexyl phenyl ketone or benzildimethyl ketal and, in pigmented systems, 2-methyl-1-(4-(methylthio)phenyl-2-morpholino-1-propanone or trimethylbenzoyl-diphenylphosphine oxide.

The photoinitiators mentioned are preferably used in amounts of 0.1 to 10 wt. %, preferably 0.1 to 5 wt. %, based on the weight of the polyurethanes, They may be used individually or, due to frequent advantageous synergistic effects, as mixtures.

EXAMPLES

In the examples below, all percentages are by weight, unless otherwise specified.

Examples 1 and 2 describe the preparation of compounds containing (meth)acryloyl groups that are crystalline in the solid state and have a melting point of 30 to 110° C.:

Example 1

168.2 g of hexamethylene diisocyanate, 0.1 g of dibutyltin dilaurate, 0.2 g of 2,5-di-tert-butylhydroquinone, 0.8 g of 2,6-di-tert-butyl-4-methylphenol were introduced into a heatable 2 l reaction vessel having a stirrer, dropping funnel, gas inlet and internal thermometer and heated to 80° C. while stirring and passing air through (3 l/h). 232.2 g of 2-hydroxyethyl acrylate were added such that the internal temperature did not exceed 90° C. Stirring was then continued at 90° C. until the NCO content was below 0.2%. The hot melt was poured into an aluminium dish, where it solidified and crystallized. The cooled, crystallized product was comminuted mechanically and had a melting point of 69–70° C.

Example 2

254.0 g of 4,4'-diphenylmethane diisocyanate (MDI), 0.1 g of dibutyltin dilaurate, 0.2 g of 2,5-di-tert-butylhydroquinone, 0.8 g of 2,6-di-tert-butyl-4-methylphenol were introduced into a heatable 2 l reaction vessel having a stirrer, dropping funnel, gas inlet and internal thermometer and heated to 80° C. while stirring and passing air through (3 l/h). 260.1 g of 2-hydroxyethyl methacrylate were added such that the internal temperature did not exceed 95° C. Stirring was then continued at 95° C. until the NCO content was below 0.2%. The hot melt was poured into an aluminium dish, where it solidified and crystallized. The cooled, crystallized product was comminuted mechanically and had a melting point of 89–90° C.

Examples 3, 4 and 5 describe the preparation of urethane acrylates in compounds containing (meth)acryloyl groups that were crystalline in the solid state and have a melting point of 30 to 110° C.:

Example 3

50.00 g of bisphenol A dimethacrylate (m.p. 72–74° C., supplied by Aldrich), 31.25 g of isophorone diisocyanate, 0.02 g of dibutyltin dilaurate, 0.02 g of 2,5-di-tert-butylhydroquinone, 0.10 g of 2,6-di-tert-butyl-4-methylphenol were mixed and dissolved or melted at 80° C. At 80 to 90° C., 9.80 g of 2-hydroxyethyl acrylate were first added, then 8.80 g of trimethylpropane were added. Stirring was continued until the NCO content of the reaction mixture was below 0.2%. The hot melt was then poured into an aluminium dish, where it slowly solidified and crystallized. The cooled, crystallized product was comminuted mechanically.

Example 4

1255.0 g of the product of Example 1), 781.3 g of isophorone diisocyanate, 0.6 g of dibutyltin dilaurate, 0.5 g of 2,5-di-tert-butylhydroquinone, 2,5 g of 2,6-di-tert-butyl-4-methylphenol were mixed and dissolved or melted at 80° C. At 80 to 90° C., 245.0 g of 2-hydroxyethyl acrylate were first added, followed by 220.0 g of trimethylolpropane. Stirring was continued until the NCO content of the reaction mixture was below 0.2%. The hot melt was then poured into an aluminium dish, where it slowly solidified and crystallized. The cooled, crystallized product was comminuted mechanically.

Example 5

Example 4 was repeated, with the exception that that 642.7 g of the reaction product of 1.0 mole of 1,4-butanediol with 1,5 moles of ε-caprolactone were used instead of 220.0 g of trimethylolpropane.

Example 6

Application Example

To determine the powder coating properties, 96 wt. % of the binder from Example 4) were first premixed with 3 wt.

% of a photoinitiator (Irgacure 2959, supplied by Ciba Specialty Chemicals, Lampertheim) and 1 wt. % of a flow control agent (Byk LPG 6952, supplied by Byk Chemie, Wesel) in a premixer (Pilot 3, supplied by Prism) for 30 seconds at 2500 rev/min. The mixture was then further processed in an extruder (type MT 19 PC, supplied by APV) at a temperature of 45° C. in zones 1 and 2 and at 300 rev/min at approximately 60% capacity. The extruded mixture was coarsely comminuted mechanically after crystallization and then ground in a classifier mill (type ICM 4, supplied by Neuman & Esser) with the settings classifier 30 m/s and rotor 100 m/s. After screening to exclude ground material having a diameter greater than 90 $\mu$m, the resulting powder was sprayed with an electrostatic gun (supplied by Wagner) at 80 kV onto an iron sheet that was pretreated with a cathodic dip coating (supplied by Bonder). The sheet was heated for 5 min in an oven at 100° C. A homogeneous, liquid film was formed. Immediately thereafter, the sheet was conveyed while hot past the UV radiator (mercury high-pressure radiator, 80 W/cm, distance 20 cm, belt speed 5 m/min). The film was immediately hard and was tested after cooling to room temperature and 60 min storage. The layer thickness was 80 to 100 $\mu$m.

The solvent resistance was assessed by means of a cotton wool pad impregnated with butyl acetate that was passed over the film with a contact pressure of approximately 1 kg in 100 double rubs. The scratch resistance was tested by scratching with a fingernail. The film was solvent resistant and scratch resistant.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing urethanes containing (meth) acryloyl groups that are suitable as binders for powder coatings, which comprises reacting
    i) a polyisocyanate component with
    ii) an isocyanate-reactive component that comprises
        a) at least one monohydric alcohol containing (meth) acryloyl groups and
        b) at least one compound that is free from (meth) acryloyl groups and contains isocyanate-reactive groups, in
    iii) a melt of at least one compound containing (meth) acryloyl groups, which is crystalline in the solid state and has a melting point of 30 to 100° C. and a dynamic viscosity at 111° C. of less than 10 Pa·s,
    at elevated temperature until the content of NCO has dropped below 0.5 wt. %.

2. The process of claim 1 wherein said compound containing (meth)acryloyl groups comprises a mono-, di- and/or oligourethane.

3. A powder coating composition containing the urethanes prepared by the process of claim 1 as the binder.

4. A wood, metal, plastics or mineral substrate coated with the powder coating composition of claim 3.

5. The process of claim 1 wherein component i) is present in an amount of 40 to 80 parts by weight, component ii-a) is present in an amount of 15 to 50 parts by weight and component ii-b) is present in an amount of 2 to 20 parts by weight.

6. The process of claim 2 wherein component i) is present in an amount of 40 to 80 parts by weight, component ii-a) is present in an amount of 15 to 50 parts by weight and component ii-b) is present in an amount of 2 to 20 parts by weight.

* * * * *